(No Model.)
W. E. SELLECK.
FORM FOR BANK CHECK OR THE LIKE.
No. 507,850. Patented Oct. 31, 1893.
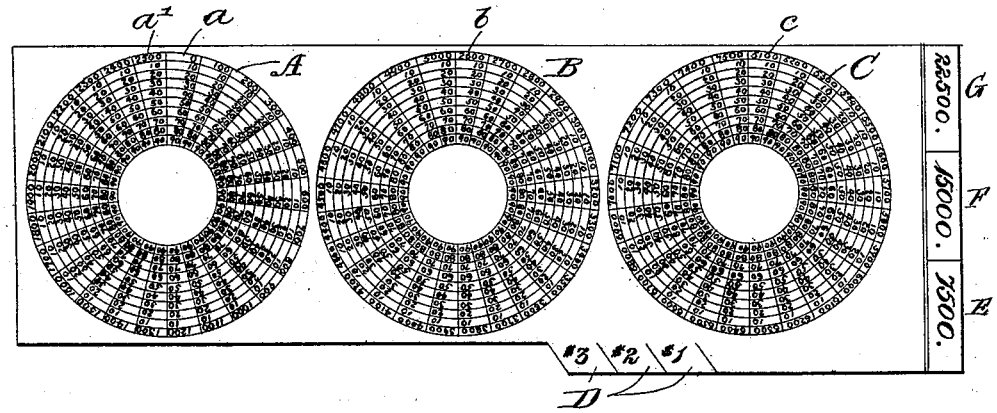
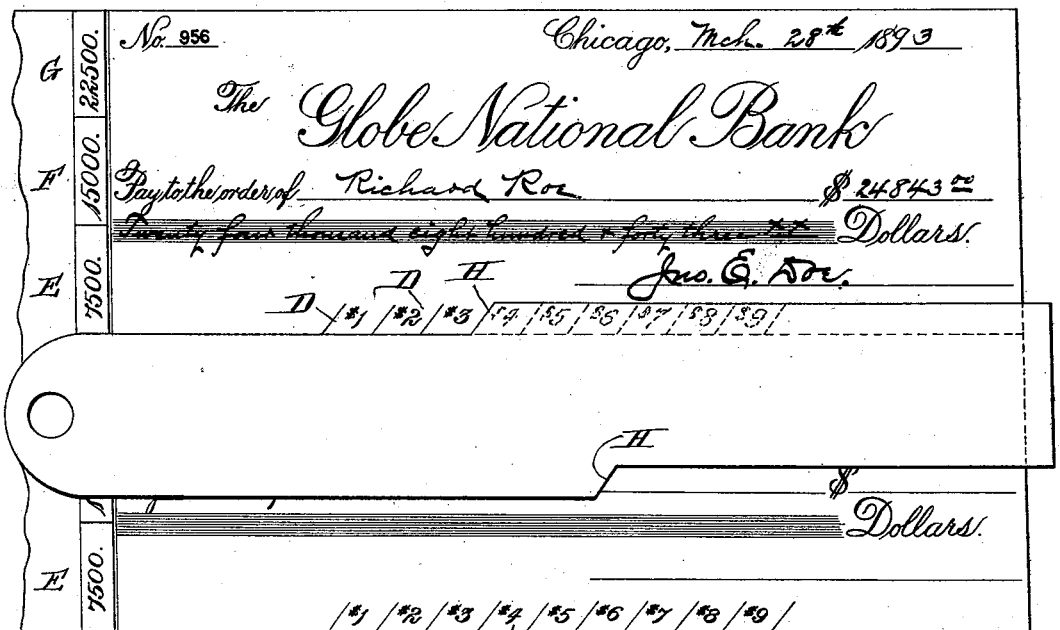

UNITED STATES PATENT OFFICE.

WILLIAM E. SELLECK, OF CHICAGO, ILLINOIS.

FORM FOR BANK-CHECKS OR THE LIKE.

SPECIFICATION forming part of Letters Patent No. 507,850, dated October 31, 1893.

Application filed April 3, 1893. Serial No. 468,883. (No model.)

*To all whom it may concern:*

Be it known that I, WILLIAM E. SELLECK, a citizen of the United States, residing at Chicago, in the county of Cook and State of Illinois, have invented certain new and useful Improvements in Forms for Bank-Checks, Negotiable Instruments, &c., of which the following is a specification.

My invention relates to improvements in forms or blanks for bank checks, negotiable instruments and other documents having a monetary value and drawn as an order for the payment thereof, and the improvements have more especial reference to means for preventing the fraudulent raising or increasing of the amount for which the instrument was originally drawn, without detection.

It is generally conceded that by the use of chemicals any ink may be entirely eliminated from even the most delicate papers, and that the nearest approach to an absolute safe-guard against the fraudulent alteration of checks, &c., is the check punch which indicates the amount by removing portions of the paper. But these punches are necessarily costly and generally beyond the means of the ordinary depositor, and are too bulky to be carried about the person and are therefore appropriate only for office use.

The primary object of my invention, therefore, is to provide the blank or form itself, with improved means whereby the drawer or maker of the check or other similar instrument, may leave on the same, indestructible or unalterable evidence of its lawful value.

With this end in view my invention consists in certain features of novelty herein described and shown in the accompanying drawings and more particularly pointed out in the claims.

In the said drawings, Figure 1 is a view of the reverse side of a check or blank, provided with my improvements, and Fig. 2 is a face view of one page of a check book containing checks provided with my improvements, illustrating the manner of cutting the check loose.

Like signs of reference indicate like parts in both views.

In carrying out my invention I indicate upon the check or blank, values ranging from a small amount to about the largest amount for which checks and the like are usually drawn in the course of ordinary business, and such amounts preferably increasing by tens from the smaller to the larger; and in order that the requisite number of amounts may be indicated upon a check or blank of ordinary size, such amounts are arranged in very close order. With a bank check for instance, thus equipped, it will be seen that the drawer, in order to prevent the raising of the amount, is simply required to punch out or otherwise mutilate the number on the check which indicates the highest number of dollars for which the check is drawn, thus furnishing the paying teller of the bank and other parties, with positive evidence that if the amount of the check exceeds the amount of the mutilated or punched number, or if several of the numbers should be mutilated or punched, the lowest of them, the check has been tampered with and its face value is fraudulent. This mutilation of the proper number may be effected very conveniently by simply poking the pen through the paper where the number is printed, and which will at once destroy the paper and stain the ragged edges of the perforation with ink, or a small punch such as ordinarily used by railway conductors may be employed. These amounts may be indicated on either the back or the face of the check. When indicated on the face a color of ink which will contrast with the color of ink with which the check is printed, may be employed. For ordinary business purposes it is sufficient that the amounts range from ten dollars up, increasing by ten as described, and this guards against a loss of any amount equal to or exceeding ten dollars, it being unnecessary to guard against the loss of a smaller amount inasmuch as the same is inconsiderable as compared with the risk of being detected, and but few even expert forgers would deem the consideration sufficient for the risk. It is of course obvious that any number of dollars less than ten might also be indicated in a separate column on the check, but this would necessitate punching the check in two places, one to indicate the units of dollars and the other tens of dollars, and hence with a check punched twice it would be impossible to determine whether one punch was not made fraudulently. With my invention however it is understood that the check must not under any circumstances have more than one punch. Hence if the check were drawn for two thousand five hundred and six dollars for instance, the 2,500 would be punched out to indicate that the highest number of tens of dollars is two hundred and fifty, the drawer taking the risk of the units of dollars being raised from six dollars to nine dollars and ninety nine cents. However, if desired the edge of the instrument or check may be provided with detachable coupons ranging in value from one dollar to nine dollars so that in cutting the check out of the check book all of the coupons save those up to and including the one representing the highest number of dollars less than ten for which the check is drawn may be cut off; thus making it possible to indicate the number of dollars below ten as well as those above by simply punching the check once and tearing off the coupons which exceed in value the number of dollars below ten.

Referring now more particularly to Fig. 1 of the drawings in which I have shown the aforesaid numbers or amounts ranging from ten dollars up, on the back or reverse side of a bank check, it will be seen that I have arranged such numbers in separate groups A—B—C, the numbers in the first group beginning with ten dollars but the first space being occupied by a cipher and increasing by ten to as high a number as can be placed on the check. In the size of checks shown in the drawings this number is two thousand five hundred and ninety dollars, but of course the amount which each group may represent is simply dependent upon the size of the paper or blank and the figures. By arranging the figures in radial columns however as shown in Fig. 1, I am enabled to greatly condense the matter and get more figures of a given size on a blank of a given size than if they were arranged in parallel columns. This is because when arranged radially the hundreds of dollars or numbers containing three or more figures and ciphers, need be arranged at the outer ends of the column only, and the first figures at the inner ends of some of the columns (preferably at the inner ends of all those representing amounts containing three or more figures or figures and ciphers) may be omitted; thus permitting the inner ends of the columns to be comparatively very narrow and arranged close together in a very condensed form. In this manner the outer figures at the head of each column may indicate the number of hundreds or thousands of dollars, and the figures succeeding inward in each column, the fractions of a hundred. Thus, supposing that the number 40 under 2,500 in group A should be punched out. This would indicate that the check was originally drawn for two thousand five hundred and forty dollars, because it is to be assumed that each of the numbers ranging from 10 to 90 when punched out is to be substituted for and read as the last two figures of the number at the outer end of the column. Each column therefore runs from a hundred to a hundred and ninety or from a number of hundreds to a number of hundreds and ninety as the case may be, and each succeeding column begins at its outer end where the preceding one leaves off at its inner end. The succeeding groups B and C are similarly formed the only difference being that the first column $b$ in the group B begins where the last column $a'$ in the group A leaves off, and in like manner the first column $c$ of the group C begins where the last column of the group B leaves off. Thus it will be seen that by this particular arrangement of the figures in groups of radial columns, I am enabled to provide the back of the check or blank of ordinary size, with sufficient numbers to indicate amounts ranging from ten dollars and increasing by ten to seven thousand five hundred and ninety, which will embrace all amounts for which checks are drawn in the course of ordinary business transactions; and with a check or instrument provided with my improvements the drawer or maker has at his command convenient means for guarding against the loss of amounts of ten dollars and over, and to utilize such means requires of him simply that he punch the check once in the proper place. This grouping of the numbers together as described, has the further advantage of rendering it more convenient to find the proper number than would be the case if they were arranged in mass because it may be soon learned that the first group contains amounts from ten dollars to two thousand five hundred and ninety dollars, the second from two thousand six hundred dollars to five thousand and ninety dollars and the third from five thousand one hundred dollars to seven thousand five hundred and ninety dollars, or any other divisions into which the total number of amounts may be divided, and as the hundreds and thousands occur around the outer edge of the circle in regular progression, it is simply necessary in order to find the proper number, to follow the outer circle of numbers until the proper column is reached, the numbers in all the columns within the outer circle being the same in each column. Furthermore, the groups being arranged in regular order, one after another, their location in a measure indicates their value and the paying teller by observing that the punch is at the mid-length or at the left or right hand end, is enabled to determine at a glance that the check does not exceed at least, the first amount of the next highest group. As already explained, in conjunction with these groups A—B—C may if desired, be employed the coupons D to represent dollars from one to nine. These may be formed along the edge of the check as shown, and in order that their location on the back may be determined without turning the check over, so that they may be conveniently torn off when cutting the check out of the check book by one and the same operation, they are duplicated on the face of the check as shown in Fig. 2, they being formed also on the back in order that they may be conveniently read in conjunction with the numbers in the groups A—B—C. With a check thus equipped it will be understood that the highest coupon left on the check would indicate the highest number of dollars less than ten for which the check is drawn, and the punch in one of the groups A—B and C, the number of dollars above ten. Thus with the check in the condition shown in Fig. 1, assuming that the number 40 under 2,500, group A, is punched out (leaving out of consideration for the time being the coupons at the end of the check which will be presently described) the amount indicated would be two thousand five hundred and forty-three dollars, but in case the check should be drawn for three dollars, then the cipher or naught which is placed at the head of the first column $a$ of the group A, would be punched out to indicate that the amount does not exceed ten dollars, the coupon for three dollars being left as shown.

As before explained, checks are not often drawn for more than the amount indicated by group C, but in order that the capacity of the check may be still further extended, a number of detachable coupons E—F—G may be formed on the end of the check as shown in Fig. 1, the lowest one of which beginning where the last column of the group C leaves off, and the succeeding coupons F—G increasing by any desired amount. As shown in the drawings, the first coupon indicates seven thousand five hundred dollars, the second fifteen thousand dollars and the third twenty-two thousand five hundred dollars. These coupons are treated like the coupons D, that is, those exceeding the lawful value of the check are torn off, and the highest remaining one is added to the amount punched in one of the groups A—B—C and to the highest one on the coupons D. Thus if the check should be drawn for fifteen thousand dollars for instance, the coupons F and G and all of the coupons D would be torn off and the check would be punched through the number 7,500 in group C. This punched amount added to the amount of the highest coupon remaining on the check which is the coupon E for seven thousand five hundred dollars makes fifteen thousand dollars, the amount of the check. As shown in the drawings however, the check is drawn for twenty-four thousand eight hundred and forty-three dollars. To indicate this amount it is punched through the number 40 in the 2,300 column of group A, and all of the coupons D excepting three dollars and less are torn off, the coupons E—F—G being left intact. Thus twenty-two thousand five hundred dollars the amount of the highest coupon plus two thousand three hundred and forty dollars the amount punched, plus three dollars the amount of the highest one of the coupons D equals the amount indicated on the face of the check.

It will be understood that these coupons may be conveniently torn off when cutting the check out of the check book by means of a paper cutter formed substantially as shown in Fig. 2, with an off-set H in one or both edges thereof, such off-set being formed obliquely so as to make the tear or cut between the coupons come more directly in line with the general line of cut produced in severing the check from the page, the divisions between the coupons being formed on an incline if desired.

Having thus fully described my invention, what I claim as new therein, and desire to secure by Letters Patent, is—

1. As a new and useful article of manufacture, a form or blank for bank checks, and the like, having amounts indicated thereon and such amounts being arranged in radial columns, and the first figures of the amounts at the inner ends of some of said columns being omitted, whereby such ends may be arranged in a condensed form, substantially as shown and described.

2. As a new and useful article of manufacture, a form or blank for bank checks and the like, having amounts indicated thereon and such amounts being arranged in groups of different values and each group being composed of radial columns, and the first figures of the amounts at the inner ends of some of said columns being omitted, whereby such ends may be arranged in a condensed form, substantially as shown and described.

3. In a new and useful article of manufacture, a form or blank for bank checks and the like, having amounts indicated thereon and said amounts being arranged in groups consisting of radial columns and detachable coupons on said form representing amounts greater or less than the aforesaid amounts, substantially as shown and described.

WM. E. SELLECK.

Witnesses:
F. A. HOPKINS,
EDNA B. JOHNSON.